May 20, 1941.   J. M. FEILDERS   2,242,576
CONTAINER OUTLET
Filed March 24, 1939

INVENTOR
Jessie Main Feilders
BY
Hanbury a Sudden
ATTORNEY

Patented May 20, 1941

2,242,576

UNITED STATES PATENT OFFICE 2,242,576

CONTAINER OUTLET

Jessie Muir Feilders, Montreal, Quebec, Canada

Application March 24, 1939, Serial No. 263,880

1 Claim. (Cl. 221—104)

This invention relates to providing a sealed container with a measuring outlet.

In the distribution of a variety of food and other products in granular condition it is often important to pack them in sealed containers as the exposure of the contents to the air has an injurious effect and a deterioration in quality. When such products are packed in sealed tins, upon opening the tin, unless the entire contents were used, the unused portion was liable to be affected by exposure.

By means of this invention a sealed tin is provided with an outlet device which while it preserves the seal at all times, measures a quantity of the contents to be removed at one time.

The device consists briefly in attaching to the container, preferably on the bottom, a sliding compartment which in one position opens to an opening in the container but has its other outlet sealed while in its other positions seals the container outlet and opens its outlet to deliver its contents.

In the form shown and described to illustrate the principle of my invention the construction is simple and inexpensive. I do not confine the scope of my invention to this form as it can be carried out by other detail designs.

Reference is made to the accompanying drawing in which—

Figure 1:
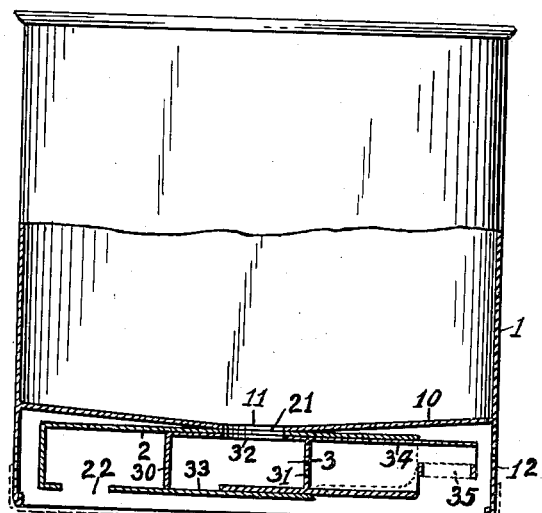
Figure 1 shows a cross section through the container and outlet in the position to fill the compartment.

The container 1 has a bottom 10 which is preferably slightly convexed and has a central opening 11. Securely soldered to the bottom 10 is the casing or slideway 2 cut away at 20 with an opening 21 corresponding with the opening 11 and an opening 22. Slidably mounted in the slideway 2 but fitting closely is the compartment 3. This compartment has end walls 30 and 31 which determine the quantity to be extracted from the container 1. This compartment 3 has an inlet 32 the same size as the outlet 11, and an outlet 33 similar to the outlet 22. The walls 34 of the compartment 3 extend beyond the end wall 31 and has a finger ring 35 at its end. The container 1 is preferably provided with an extension rim 12, and may be provided with a cover 13.

Figure 2:
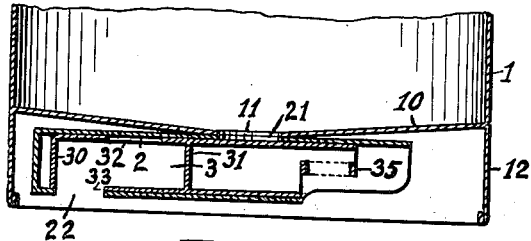
Figure 2 shows a similar cross section with the compartment in the position to empty.
Figure 4:
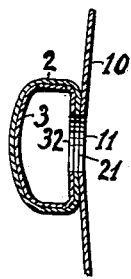
Figure 4 shows a cross section of Figure 3, on the lines 4—4.
Figure 3:
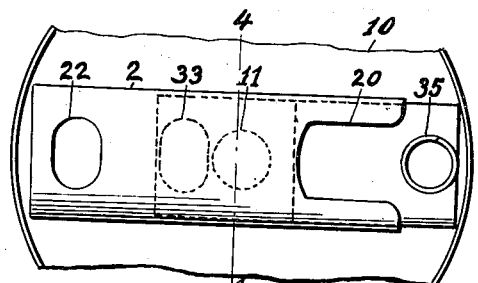
Figure 3 shows a plan view of the bottom of the container and the outlet, the latter in the position of Figure 1.

The operation of the device is as follows:

The container is filled and sealed in the usual way. When it is desired to extract one compartment full of the contents the finger is inserted in the ring and moves the compartment to the position shown in Figure 1. The outlet 22 is then held over the receptacle to be charged and the finger then pushes the compartment to the position shown in Figure 2. This operation can be repeated as often as required and the receptacle will contain a known quantity of the contents of the container. When not in use it is better to keep the sliding compartment in the position of Figure 2, where the outlet of the container is sealed directly.

As the compartment can be varied in size to contain a given measure of the contents at each operation, the device can be applied to a large number of containers of substances which are used in measured quantities.

It is obvious that the casing could be made attachable to the container in place of being permanently secured thereto.

What I claim is:

A container having an outlet, a slideway casing mounted over the outlet having an opening corresponding to the outlet, a compartment sliding in the casing across the outlet, having an inlet and an outlet and an extension provided with a finger ring, the casing being cut away over the path of the finger ring, the compartment in one position opening its inlet to the container outlet and sealing its outlet by the casing, and when sliding to the second position, sealing the container outlet before opening its own outlet.

JESSIE MUIR FEILDERS.